United States Patent [19]
Nordeen

[11] 4,078,728
[45] Mar. 14, 1978

[54] COMBINED COUPLING AND AIR NOZZLE

[76] Inventor: Melvin A. Nordeen, 724 W. Linwood, Turlock, Calif. 95380

[21] Appl. No.: 768,705

[22] Filed: Feb. 15, 1977

[51] Int. Cl.² ............................................. F16K 1/00
[52] U.S. Cl. .................................. 239/586; 239/267; 137/881; 173/65
[58] Field of Search ............... 239/DIG. 21, DIG. 22, 239/267, 586; 137/608, 612.1, 614.17, 637.2; 173/64, 65

[56] References Cited

U.S. PATENT DOCUMENTS

| 2,344,492 | 3/1944 | Brubaker | 137/608 X |
| 2,716,998 | 9/1955 | Knasko | 137/612.1 X |
| 2,869,573 | 1/1959 | Stafford | 137/612.1 X |
| 2,880,747 | 4/1959 | Newcomb | 137/612.1 X |
| 3,707,994 | 1/1973 | Brown | 137/614.17 X |

*Primary Examiner*—Robert W. Saifer
*Attorney, Agent, or Firm*—Clarence A. O'Brien; Harvey B. Jacobson

[57] ABSTRACT

A main body is provided having a fluid passage extending therethrough including inlet and outlet ends. The body further defines a branch passage having an outlet end portion opening outwardly of the body and an inlet end portion opening into an intermediate portion of the main fluid passage. The intermediate portion of the main fluid passage includes structure defining a valve seat therein and a valve body is mounted in the inlet end portion of the branch passage for adjustable positioning therealong and includes a main valve portion opposing the seat and operable to variably throttle the main flow passage upon shifting of the main valve portion toward and away from the seat. The valve body includes a flow passage formed therein having an inlet end opening through the main valve portion and communicating with the main fluid passage intermediate portion and an outlet end communicating with the outlet end portion of the branch passage. A valve member is shiftably supported from the valve body and is operable to variably throttle and close the flow passage. Shifting of the valve body main valve portion toward and away from the valve seat of the intermediate portion of the main passage serves not only to variably throttle the main fluid passage but to also throttle the main fluid passage upstream from the flow passage and thereby the maximum fluid flow which may pass through the flow passage.

9 Claims, 3 Drawing Figures

COMBINED COUPLING AND AIR NOZZLE

BACKGROUND OF THE INVENTION

There are many forms of repair and maintenance shops in which compressed air is utilized to drive various tools and in which it is sometimes desired to detach a pneumatic tool from an air line and attach a blow gun to the air line in order that certain repair or maintenance procedures requiring a jet discharge of air may be carried out.

Conventionally, the outlet ends of air lines are provided with disconnect couplers whereby a pneumatic tool and blow gun may be quickly interchanged on the discharge end of the air line.

However, if a person utilizing a pneumatic tool wishes to use a blow gun between successive uses of the pneumatic tool, after the first use of the pneumatic tool he must then disconnect the pneumatic tool and attach a blow gun to the discharge end of the air line. Thereafter, the blow gun may be used. However, before the pneumatic tool may again be used, the blow gun must be disconnected from the discharge end of the air line and the pneumatic tool must be reconnected to the discharge end of the air line. This series of successive steps is time consuming and results in multiple handling of a pneumatic tool and the blow gun throughout a given period requiring the use of both a pneumatic tool and a blow gun and can sometimes result in the pneumatic tool or blow gun being dropped or otherwise damaged as a result of its being repeatedly manually handled. In addition, the quick disconnect coupling on the discharge end of the air line is repeatedly subjected to disconnect and connect operations resulting in a shortened operating life of the coupling.

Accordingly, a need exists for structure whereby both a pneumatic tool and a blow gun may be simultaneously coupled to the discharge end of an air line while still maintaining the ability of utilizing alternate pneumatic tools on the discharge end of the air line.

Examples of couplings and blow guns as well as similar structures including some of the basic structural and operational features of the instant invention are disclosed in U.S. Pat. Nos. 1,389,539, 1,477,353, 1,667,699, 2,252,141, 2,633,324, and 3,661,182.

BRIEF DESCRIPTION OF THE INVENTION

The combined coupling and air nozzle of the instant invention is specifically adapted for use on the discharge end of a flexible air line with which various pneumatic tools as well as blow guns may be alternately used.

The combined coupling and air nozzle comprises a fitting to be mounted on the discharge end of an air line and the fitting has an air passage extending therethrough including inlet and outlet ends. The coupling is designed to be coupled to the discharge end of an air line with the air line opening into the inlet end of the passage and a pneumatic tool may be removably coupled to the fitting with the outlet end of the passage communicated with the pneumatic tool. Further, the fitting includes a lateral branch passage whose outlet end opens outwardly of the fitting and whose inlet end opens into an intermediate portion of the main passage extending through the fitting. Valve structure is provided for variably throttling the main passage and second valve structure is provided for variably throttling the lateral or branch passage downstream from the main passage.

The main object of this invention is to provide a fitting for the outlet end of a flexible air line and including integral structure defining a blow gun as well as structure enabling a pneumatic tool to be coupled to the fitting independently of the blow gun defining structure.

Yet another object of this invention is to provide a fitting in accordance with the preceding object and including valve structure whereby the flow of air through the fitting to the associated pneumatic tool may be variably adjusted.

Still another object of this invention is to provide a fitting including valve structure whereby the flow of air from the blow gun defining portion thereof may be variably throttled and terminated as desired.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
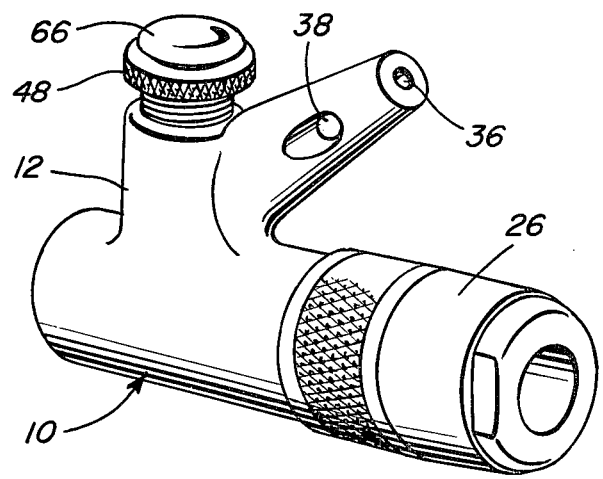
FIG. 1 is a perspective view of a first form of combined coupling and air nozzle constructed in accordance with the present invention.
Figure 2:
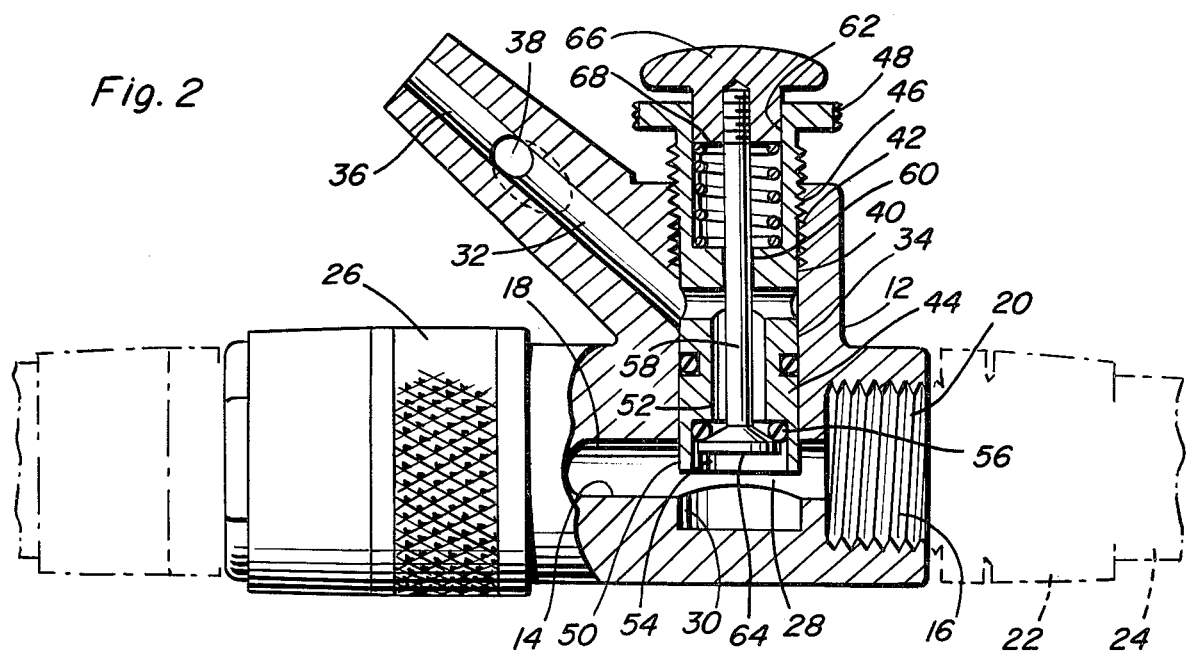
FIG. 2 is an enlarged, side, elevational view of the apparatus illustrated in FIG. 1 as seen from the rear side thereof and with portions thereof being broken away and illustrated in longitudinal vertical section.

Referring now more specifically to the drawings, the numeral 10 generally designates the combined coupling and air nozzle of the instant invention. The coupling and air nozzle 10 includes a main body 12 having a main fluid passage 14 extending therethrough including inlet and outlet ends 16 and 18. The inlet end 16 includes a diametrically enlarged threaded portion 20 in which the discharge end 22 of a flexible air line 24 may be removably threaded and the outlet end 18 of the passage 14 has a quick disconnect coupler 26 of conventional design operatively associated therewith and supported from the body 12.

The passage 14 additionally includes an intermediate portion 28 defining a valve seat 30 and the body 12 has a branch passage 32 formed therein including an inlet end portion 34 opening into the intermediate portion 28 and an outlet end portion 36 opening exteriorly of the body 12. The outlet end portion 36 includes a vent port 38 to prevent excess build up of pressure in the passage 32 in the event the outer end thereof becomes clogged. Further, the port 38 also serves as a means whereby ambient air may be drawn into the outlet end portion 36 as a result of the rapid flow of air through the branch passage 32.

The inlet end portion 34 of the branch passage 32 includes an extension 40 remote from the intermediate portion 28 and which is internally threaded as at 42 and opens exteriorly of the body 12. A valve body 44 is threadedly engaged in the extension 40, as at 46, an includes a knurled knob portion 48 disposed exteriorly of the body 12. The end of the valve body 44 remote from the knob portion 48 defines a main valve portion 50 which opposes the seat 30 and is movable toward and away from the latter upon threaded adjustment of the valve body 44 in the inlet end portion 34 of the branch passage 32. The valve body 44 includes a flow passage 52 extending therethrough and including a diametrically enlarged portion 54 which opens into the main flow passage 14 toward the valve seat 30. The diametrically enlarged portion includes a resilient valve seat ring 56 seated therein and an elongated valve element 58 extends through the flow passage 52 and a bore 60 formed in the valve body 44 which opens centrally through the knob portion 48 and is provided with a diametrically enlarged outer end counterbore 62. The valve element 58 includes a diametrically enlarged head 64 which opposes and is seatable against the valve seat defining ring 56 and the end of the valve element 58 remote from the head 64 is provided with a diametrically enlarged push buttom 66 slidably received in the counterbore 62, a compression spring 68 being disposed in the counterbore 62 between the inner end thereof and the push botton 66 about the valve element 58. Accordingly, the compression spring 68 yieldingly biases the valve element 58 to a position with the head 64 thereof seated against the valve seat defining O-ring 56 to close the flow passage 52 at the inlet end thereof.

The coupler 26 may have any form of pneumatic tool operatively coupled thereto for communicating the main fluid passage 14 with the pneumatic tool and the knob portion 48 of the valve body 44 may be adjustably turned to cause shifting of the main valve portion 50 toward and away from the seat 30 whereby the flow of air through the main fluid passage 14 may be variably throttled. In addition, adjustment of the main valve 50 toward and away from the seat 30 variably throttles the flow of air from the inlet end portion 16 of the passage 14 through the branch passage 32 when the valve element 58 is in the full open position. Thus, the valve element 58 throttles the flow of air through the branch passage 52 from the intermediate portion 28 of the passage 14 through the outlet end portion 36 of the passage 32, but the main valve 50 throttles the air which is supplied to the flow passage 52 which opens into the branch passage 32.

In operation, if a person is utilizing a pneumatic tool operatively coupled to the coupler 26 and then desires to utilize the blow gun defined by the branch passage 32, it is merely necessary for that person to grasp the main body 12 to direct the outlet end portion 36 of the branch passage 32 in the direction in which a jet of air is desired. Thereafter, the push botton 66 is depressed whereby air will be allowed to flow from the inlet end portion 16 of the main passage 14 through the valve body 44 and out the outlet end portion 36 of the branch passage 32.

Figure 3:
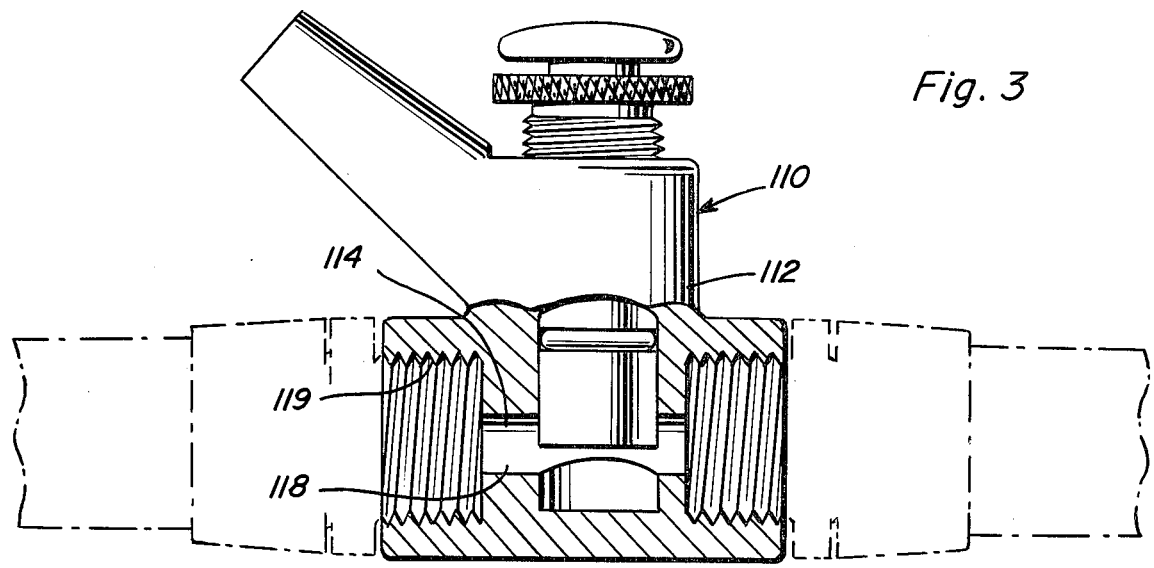
FIG. 3 is a side, elevational view of a second form of combined coupling and air nozzle constructed in accordance with the present invention and having portions thereof being broken away and illustrated in vertical section.

With attention now invited more specifically to FIG. 3 of the drawings, a second form of the invention is referred to in general by reference numeral 110. The apparatus 110 is substantially identical to the apparatus 10, except that the outlet end 118 of the main passage 114 corresponding to the passage 14 includes an internally threaded diametrically enlarged portion 119 in which the inlet hose for a pneumatic tool may be threadedly engaged. Otherwise, the apparatus 110 is structurally and operationally the same as the apparatus 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combined coupling and air nozzle including a main body having a main fluid passage extending therethrough including inlet and outlet ends, said body defining a branch passage having an outlet end portion opening outwardly of said body and an inlet end portion opening into an intermediate portion of said main passage, said intermediate portion of said main passage including means defining a valve seat therein, a valve body mounted in the inlet end portion of said branch passage for adjustable positioning therealong and including a main valve portion opposing said seat and operable to variably throttle said main flow passage upon movement of said main valve portion toward and away from said seat, said valve body including a flow passage formed therein having an inlet end opening through said main valve portion and communicating with said main passage intermediate portion and an outlet end communicating with the outlet end portion of said branch passage, a valve member shiftably supported from said valve body and operable to variably throttle and close said flow passage.

2. The combination of claim 1, wherein said valve body is threadedly engaged with said main body for threaded adjustable shifting relative thereto to variably throttle said main passage and includes an outer end portion remote from said main valve portion disposed exteriorally of said main body for manual adjustment of said valve body from the exterior of said main body.

3. The combination of claim 2, wherein said valve member comprises an elongated member having a first end cooperable with said flow passage to variably throttle and close the latter and a second end slidably received through the outer end portion of said valve body for manual adjustment from the exterior of said main body.

4. The combination of claim 1, wherein said valve seat comprises a recess formed in the wall of said main passage remote from said inlet end portion of said branch passage and toward and away from which said valve body is shiftable.

5. In combination, a fitting having a main fluid passage extending therethrough including inlet and outlet ends adapted for connection with the outlet end of an air pressure supply line and the inlet of an air actuated tool, respectively, said fitting including a branch passage therein including inlet and outlet end portions opening into an intermediate portion of said main passage and outwardly of said fitting, respectively, first valve means operative from the exterior of said fitting to adjustably throttle said main passage upstream from said branch passage, and second valve means operative from the exterior of said fitting to open and close said branch passage.

6. The combination of claim 5, wherein said first valve means includes an adjustable actuator threadedly supported from said fitting.

7. The combination of claim 5, wherein said second valve means includes an actuator slidably supported from said fitting.

8. The combination of claim 5, wherein said outlet end of said main passage is diametrically enlarged and provided with internal threads for threaded connection with a pneumatic tool air supply line.

9. The combination of claim 5, wherein said fitting has a quick disconnect coupling supported therefrom defining said outlet end of said main passage.

* * * * *